July 18, 1933.    F. J. WALLENBERG    1,918,505
METHOD OF MOLDING ARTICLES WITH INSERTS
Filed Jan. 9, 1929
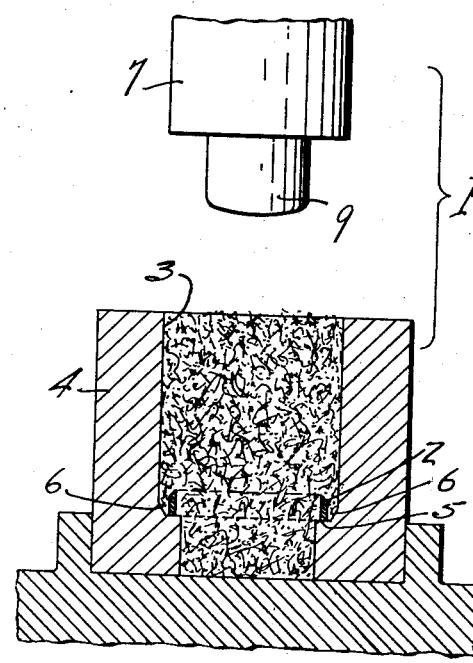
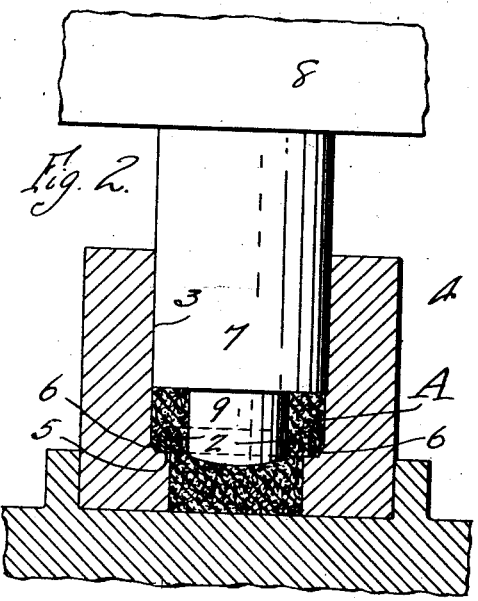
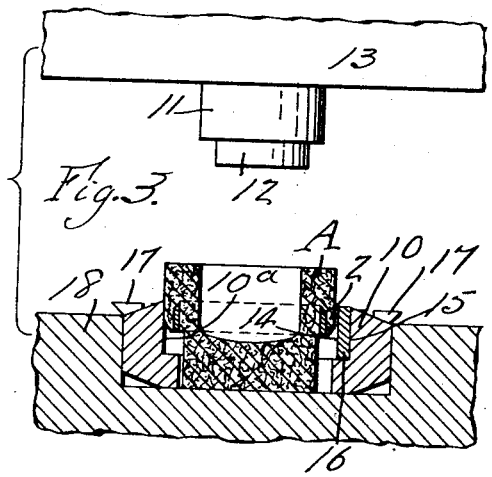
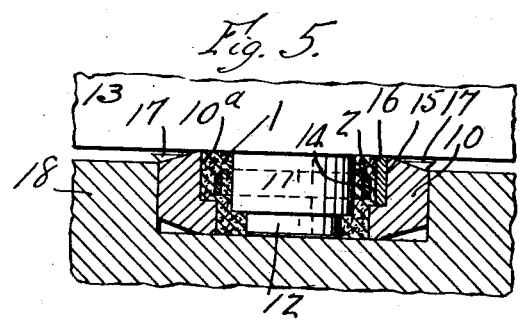
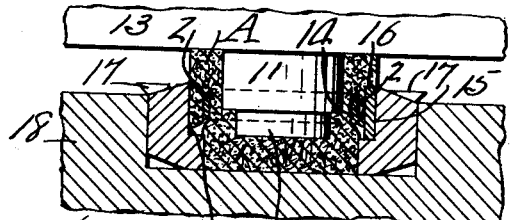
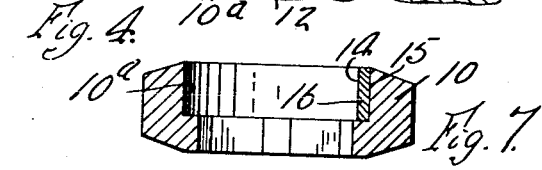
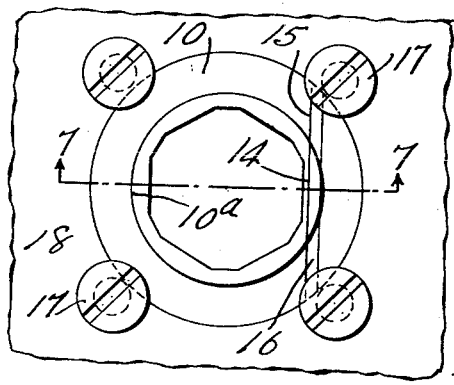
INVENTOR.
Frank J. Wallenberg
by Parker & Prochnow
ATTORNEYS.

Patented July 18, 1933

1,918,505

UNITED STATES PATENT OFFICE

FRANK J. WALLENBERG, OF TONAWANDA, NEW YORK, ASSIGNOR TO JIFFY BATTERY TERMINAL CORPORATION, OF BUFFALO, NEW YORK

METHOD OF MOLDING ARTICLES WITH INSERTS

Application filed January 9, 1929. Serial No. 331,361.

This invention relates to articles molded from plastic material and having therein a reinforcing insert, and particularly to the method of floating the insert into the interior of the article. The reinforcing inserts are usually of metal or other material which might deteriorate when exposed to air or to various acids or other chemicals. Heretofore it has been difficult to entirely enclose the insert in the body of the plastic material, and have it located in a desired and definite relation to the walls of the article.

An object of this invention is to provide an improved method of floating a reinforcing insert into the interior of an article molded from plastic material; with which the insert may be definitely located with respect to the walls of the article; with which the insert may be completely enclosed within the article and protected thereby, and which will be relatively simple and inexpensive.

A further object of the invention is to provide an improved method for floating an insert into a molded article in a simple and rapid manner, and which may be performed with relatively inexpensive apparatus.

Various other objects and advantages will be apparent from the following description of one example of the practice of the invention, and the novel features will be particularly pointed out hereinafter in connection with the appended claims.

In the accompanying drawing:—

Fig. 1 is an elevation, partly in section, of the dies used in the preforming operation and illustrating one step in the process;

Fig. 2 is a similar elevation, but with the die elements in pressing relation to one another;

Fig. 3 is an elevation partly in section of another set of die elements which may be utilized in performing a subsequent step in the process, the die elements being assembled ready for a pressing operation;

Fig. 4 is a similar elevation, but with the die elements in pressing relation to one another, the pressing operation being partially completed;

Fig. 5 is a similar elevation, but with the pressing operation completed;

Fig. 6 is a plan of the lower die element used in the final pressing operation; and Fig. 7 is a sectional elevation of the lower die element shown in Fig. 6, the section being taken approximately along the line 7—7 of Fig. 6.

In the illustrated example of the practice of the invention, the article 1 (Fig. 5) to be formed, is a clamping ring used as a part of a battery terminal connector. Such a ring must have tensile strength against stresses tending to distort the ring or break it, and for that reason is provided with a reinforcing insert 2 in the nature of an annular ring. Such a ring must be completely enclosed in the material of the article in order to be completely protected against the action of battery acids or chemicals, and the plastic material selected for such an example is one which will be inert to the action of battery acids or chemicals.

According to the improved method, the insert or ring 2 is disposed in the pressure chamber 3 of a pre-forming die element 4 and supported in that chamber intermediate the ends of the same in any suitable manner, such as upon upon a shoulder 5 formed between two sections of the chamber which may be of different widths or diameters. The shoulder 5 preferably merges into the larger section of the chamber by an oblique wall 6, so that when the ring or insert 2 is disposed in the larger section of the chamber 3, it will be guided automatically into the desired position upon the shoulder 5 by the oblique walls 6.

In such a position, the insert or ring will be supported solely upon one of its ends, and both faces as well as the opposite end of the ring will be spaced from the walls of the chamber 3. The chamber 3 is then filled with loose plastic material, as illustrated in Fig. 1. A suitable die element 7 is mounted upon a base or plate 8 by which it is moved downwardly into and out of the die chamber 3, as shown in Fig. 2.

In the particular illustrated example, the die element 7 has a reduced projecting end 9 which is adapted to produce a cavity in the molded article when the larger section of the upper die element enters and closes the upper end of the chamber 3. The loose material is partially compressed in the chamber 3, so as to be given a form and shape designated by the object A in Figs. 2 and 3.

When the loose material is compressed into the lower end of the chamber 3, it will be packed around the exposed surfaces of the insert or ring 2, and the plastic material thus compressed will adhere to the insert and completely enclose it except for the edge or surface resting upon the supporting shoulder 5. The upper die element 7 is then removed from the chamber 3, whereupon the lower die element 4 is inverted, and the partially formed object A pushed or knocked out of the die chamber through the larger end thereof.

The object A, which is sufficiently compact to hold its shape, is then placed in a final forming die element 10, Figs. 3 to 7. The die element 10 has an interior opening 10a or chamber corresponding to the desired outer surface of the finished molded article, and in the particular example, the chamber 10a has a reduced lower end. The partially formed object A may be slightly smaller than the cavity or chamber 10a in the die element 10, but the plastic material which has been compressed around the sides of the ring or insert will serve to space the insert from the side walls of the cavity or chamber of the die element 10, as shown clearly in Fig. 3.

The other die element 11 of the final forming die may have any desired shape, such as a reduced projection 12. The reduced projection 12 is provided in this particular example because a reduced cavity or passage is desired in one section of the annular ring or article 1 when finally completed. If such a reduced terminal is not desired in the molded article, the reduced projection 12 may of course be omitted, the upper die element being always given the shape and size of the cavity to be formed in the final molded article.

After the partially formed object A has been placed in the lower die element 10, as illustrated in Fig. 3, the upper die element 11, is brought towards the lower die element and forced under high pressure into the partially formed object A, as shown in Fig. 4. The upper die element 11 is carried by a plate 13, and as the plate 13 and die element descend, the die element will enter the cavity of the partially formed object A which was formed by the reduced projection 9 in the pre-forming die element. This serves to center the object A and hold it against lateral displacement as it is being compressed into the die element 10.

The die element 11 in entering the object A may displace some of the plastic material into engagement with the lateral wall of the lower die element to give a desired shape to the article and to perfectly center it, and as the upper die element continues to descend, the material forming the object A will be also engaged by plate 13 and further compressed into a more compact mass, while the die element forces its way farther downwardly into or through the object A. The portion of the object A having the insert or ring is within the cavity of the lower die element 10 when first assembled therein, as in Fig. 3, and since the ring or insert 2 cannot be enlarged by the pressure on the plastic material, the material of the object A when compressed will be forced farther around the ring or insert because it is confined within the chamber of the die element 10 and cannot go elsewhere. An intermediate step in this operation is shown in Fig. 4, where the plastic material has been forced partially around the ring or insert 2.

As the pressure continues, the plastic material will be forced around the ring from both directions, and will finally meet and unite so that the ring will then be completely enclosed by the plastic material as though floating in the plastic material, but owing to the density of the material and the pressure under which it is held, the ring will have no opportunity to settle or change its position materially, As the pressure continues, the plastic material will be further compressed into a still more compact mass, until finally the die elements reach the position shown in Fig. 5. With the die elements 10 and 11 remaining in the relation to one another shown in Fig. 5, the plastic material is allowed to harden, and thereafter the die elements 10 and 11 may be separated and the molded article 1 removed from the lower die element 10.

Any suitable plastic material may be utilized, depending upon the particular article to be formed or molded. For example, various plastic materials having as their base, a phenol condensation product, with or without a suitable filler, and the various hard rubber and asphaltic plastic materials and compositions, are all easily molded in this manner.

It will be understood, however, that these materials or compositions are cited merely as examples, and that any other suitable plastic materials or compositions may be employed, inasmuch as the invention relates primarily to the manner of floating the insert into the plastic material, and is not necessarily limited to the particular plastic material which may be selected for use.

In the illustrated example of a battery terminal connector, where considerable strength is desired and brittleness is not desired, the filler used may contain textile fibres. Such a composition may be in a loose, dry form, and as such may be quickly and easily placed in the pre-formed die chamber 3.

The chamber 3 may serve as a gage for measuring out the proper amount of the material for each article. Any excess will of course squeeze out as flash in the final pressing or molding operation. In some instances where the plastic material must be heated in order to flow freely during the molding operation, the die elements 10 and 11 may be heated during the pressing operation.

For the particular article being molded, and which has been selected as an example for the purposes of illustrating the invention, the lower die element 10 has a flat wall 14, Figs. 3, 6 and 7, and this flat wall is located as a chord at one side of a cylindrical chamber. To simplify the formation of this flat wall in the die element, the chamber may first be made cylindrical, a slot 15 then milled into the upper surface of the die element, and a plate 16 disposed edgewise in this slot 15. The plate 16 will then extend chord-like across the cylindrical chamber and form the flat wall at one side thereof.

The die element 10 may be confined to a suitable base 18, and the plate 16 confined in the slot 15, by screws 17 which are threaded into the base 18, with the heads of the screws slightly overlapping or overrunning with the die element and the plate 16 as shown in Fig. 6. The upper and lower faces of the die element 10 may also be bevelled away from a narrow, circular band along the inner space or cavity, so as to insure a more perfect and continuous contact therewith of the base 18 and the plate 13, which more perfect contact reduces the amount of flash which may form during the final pressing operation.

It will be observed that this process may be rapidly and easily performed, and that the insert or ring will be entirely enclosed in the final article, so as to be protected by the plastic material thereof. It will also be observed that the partially molded material forming the pre-formed object A, serves as a spacer for the insert and holds it properly spaced during the final pressing operation in which the plastic material is then forced completely around the insert.

The method is applicable to the molding of articles of various forms and sizes into which a reinforcing insert is to be floated or suspended.

Various changes in the details which have been herein described and illustrated in order to explain the nature of the improved method, may be made by those skilled in the art within the principle and scope of the invention as expressed in the appended claims.

I claim:—

1. The method of floating a reinforcing insert into the interior of an article molded from originally loose dry plastic material, which comprises placing said insert in a cavity, compressing a measured quantity of said loose material partially around said insert in said cavity and partially compacting it, and then with the said material spacing the insert from molding dies, further compressing and compacting the same material in said dies and forcing it completely around and inclosing the insert.

2. The method of floating a reinforcing insert into the interior of an article molded from dry, loose plastic material, which comprises supporting said insert in a pre-forming die, then, while the insert is so supported, compressing said material to mold it about the exposed surfaces of the insert, then, with the material spacing the insert from the walls of a forming die, further and completely compressing the same material and forcing it completely around and inclosing the insert.

3. The method of floating a reinforcing insert into the interior of an article molded from plastic material, which comprises supporting the insert between the ends of a pre-forming die and within the chamber of the die, and directly upon a wall thereof and molding and partially comprising a measured quantity of the material about the exposed surfaces of the insert and in opposite directions beyond said insert, then, with the molded material spacing the insert from the walls of a forming die, completely compressing the same material and forcing it completely around and inclosing the insert.

4. The method of floating an open ended reinforcing insert into the interior of an article molded from plastic material, which comprises supporting said insert at one end upon a shoulder of a pre-forming die which is located intermediate the ends of the die chamber, molding the material about the exposed surfaces of the insert, then placing the molded material and insert in a forming die with the material spacing the insert from the walls of the die, and then completely compressing the material and forcing it completely around the insert.

5. The method of floating an open ended reinforcing insert into the interior of an article molded from plastic material, which comprises supporting said insert at one end upon a shoulder of a pre-forming die which is located intermediate the ends of the die chamber and with the outer surface partially spaced from the side wall of the die, molding the material about the exposed surfaces of the insert, then placing the molded material and insert in a forming die with the material spacing the insert from the walls of the die, and then completely compressing the material and forcing it completely around the insert.

6. The method of floating a reinforcing insert into the interior of an article molded from plastic material, which comprises supporting said insert in a pre-forming die with a portion of its surfaces exposed to the die chamber, filling the die chamber with a measured quantity of a relatively loose dry molding material, compressing and compacting the material in said chamber to partially enclose the insert, removing the insert and material and placing it in a forming die in which the compressed material spaces the insert from the forming die walls, and then further compressing and compacting the same material to force it completely around the insert and into the desired form.

7. The method of floating a reinforcing insert into the interior of an article molded from plastic material, which comprises supporting said insert in the chamber of a pre-forming die, with a portion of its surfaces exposed to the chamber, supplying a selected quantity of the material to the chamber, compressing and compacting the material in the chamber to form a rigid coherent object with the material thereof partially enclosing said insert, removing said object and placing it in another die chamber which is of greater lateral dimensions than the pre-forming die with the inert spaced from the walls of the second die chamber by the compressed material, and further compressing the object in the second die chamber to force the same material thereof against the walls of that chamber and completely around the insert.

8. The method of floating a reinforcing insert into the interior of an article molded from plastic material, which comprises supporting said insert in the chamber of a pre-forming die, with its sides partially spaced from the walls of the chamber, supplying a selected quantity of the material to the chamber, compressing and compacting the material in the chamber to form a coherent, shaped retaining and smaller object with the material thereof partially enclosing said insert, removing said object and placing it in another die chamber which is of greater lateral dimentions than the preforming die with the insert spaced from the walls of the second die chamber by the compressed material, and further compressing and compacting the object in the second die chamber to force the same material thereof against the walls of that chamber and completely around the insert.

9. The method of molding an article with a completely enclosed insert, which comprises supporting the insert in a chamber larger than said article with the insert projecting into the chamber, placing in the chamber a selected quantity of loose molding material, compressing the material in the chamber to compact it and cause it to surround and tightly engage the projecting part of the insert, placing the insert and attached molding material in a chamber in which the molding material spaces the previously projecting part of the insert from the walls of the chamber, and then forcing the same molding material around the exposed surfaces of the insert and further compacting it, so as to encase completely the insert in the molding material and increase the density of said material.

10. The method of molding an article with a completely enclosed insert, which comprises supporting the insert in a chamber with part of the insert projecting into the chamber, placing in the chamber a selected quantity of dry, loose molding material, compressing the molding material in said chamber until the material is compacted and encloses and is attached to the projecting part of the insert and forms therewith a rigid, coherent object, and then, while using the compressed molding material to space the exposed part of the insert from the walls of a chamber, further compressing and compacting the same molding material in a manner to increase its density and force it completely around the insert and completely encase it.

11. The method of molding an article with a completely inclosed insert, which comprises compressing loose molding material into a smaller and denser mass and partially inclosing said insert, then placing the partially incased insert in a forming die with the insert spaced from the wall of the die by the compressed molding material, and further compressing said material to force it completely around said insert and further compact said material into a denser mass.

FRANK J. WALLENBERG.